United States Patent
Wubben

(10) Patent No.: US 12,214,620 B1
(45) Date of Patent: Feb. 4, 2025

(54) ADJUSTABLE TRACK-WIDTH SYSTEMS FOR AGRICULTURAL MACHINES

(71) Applicant: Deere & Company, Moline, IL (US)

(72) Inventor: Thomas M. Wubben, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/603,871

(22) Filed: Mar. 13, 2024

(51) Int. Cl.
*B60B 35/10* (2006.01)
*B62D 49/06* (2006.01)

(52) U.S. Cl.
CPC ........ *B60B 35/109* (2013.01); *B62D 49/0678* (2013.01); *B60B 2360/1444* (2013.01); *B60Y 2200/221* (2013.01)

(58) Field of Classification Search
CPC .............. B60B 35/109; B62D 49/0678; B62D 2360/1444; B60Y 2200/221
See application file for complete search history.

(56) References Cited

U.S. PATENT DOCUMENTS

| | | | |
|---|---|---|---|
| 5,464,243 A | 11/1995 | Maiwald et al. | |
| 6,199,769 B1 * | 3/2001 | Weddle | F16F 9/06 180/906 |
| 6,206,125 B1 * | 3/2001 | Weddle | B62D 49/0607 301/128 |
| 6,386,554 B1 * | 5/2002 | Weddle | B60G 17/033 280/6.154 |
| 8,573,846 B2 * | 11/2013 | Mackin | B60B 35/1027 301/128 |
| 9,352,782 B2 * | 5/2016 | Tollefsrud | B60B 35/109 |
| 10,226,965 B1 * | 3/2019 | Schwalbe | B60B 35/1036 |

FOREIGN PATENT DOCUMENTS

| | | | | |
|---|---|---|---|---|
| EP | 4252504 A1 * | 10/2023 | ........... | A01B 63/006 |
| GB | 2330809 A * | 5/1999 | ......... | B60B 35/1018 |

* cited by examiner

*Primary Examiner* — Faye M Fleming
(74) *Attorney, Agent, or Firm* — Harness, Dickey & Pierce, P.L.C.

(57) ABSTRACT

The adjustable track-width system may include a first axle member having a top section and a bottom section and a second axle member having a top section and a bottom section, where the second axle member is receivable by the first axle member and movable between a first position and a second position relative to the first axle member. The adjustable track-width system may further include two or more shims that determine a clearance between the first axle member and the second axle member at the first and second positions, where at least a portion of a first shim may be between the top section of the first axle member and the top section of the second axle member and at least a portion of a second shim may be between the bottom section of the first axle member and the bottom section of the second axle member.

20 Claims, 14 Drawing Sheets

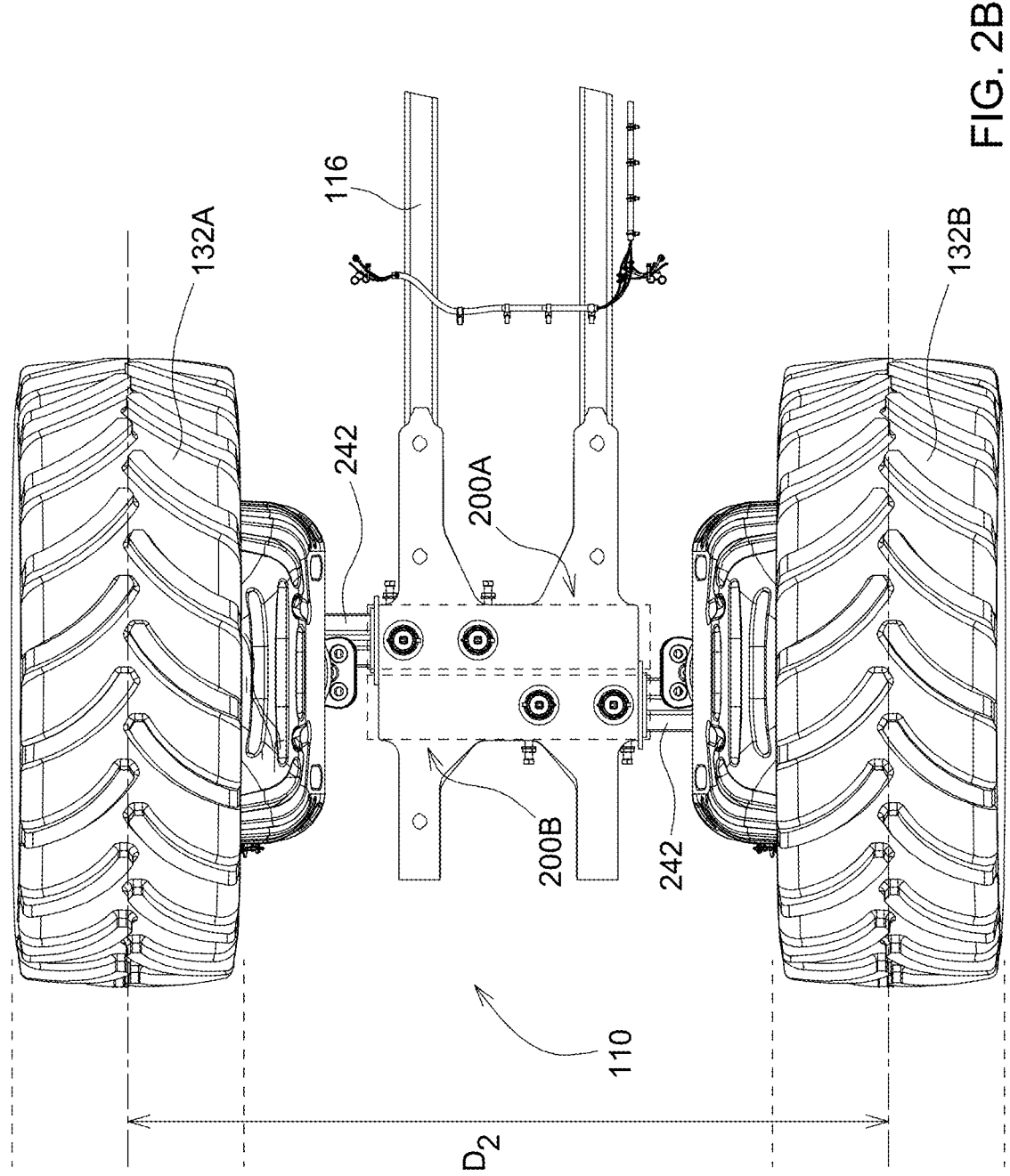

ADJUSTABLE TRACK-WIDTH SYSTEMS FOR AGRICULTURAL MACHINES

FIELD OF THE DISCLOSURE

Example embodiments relate to adjustable track-width systems, for example, for different agricultural machines.

BACKGROUND

Agricultural machines often need to be adjustable to accommodate different track width spacings in various row crop applications, including as necessitated by different fields and different crops.

SUMMARY

In various aspects, the present disclosure relates to an example adjustable track-width system for an agricultural machine.

The adjustable track-width system may include a first axle member having a first section and a second section and a second axle member having a third section and a fourth section, where the second axle member is receivable by the first axle member and movable between a first position and a second position relative to the first axle member. The adjustable track-width system may further include two or more shims that determine a clearance between the first axle member and the second axle member at the first and second positions, where the two or more shims include a first shim and a second shim. At least a portion of the first shim may be between the first section of the first axle member and the third section of the second axle member. At least a portion of the second shim may be between the second section of the first axle member and the third section of the second axle member.

The at least the portion of the second shim may be a first portion of the second shim, and the second shim may further include a second portion that is external to the first axle member.

The second portion of the second shim may engage with an exterior surface of the agricultural machine.

The second shim may include a wear member, where the wear member has a first end and an opposing second end, The first end of the wear member may be the at least the portion of the first portion of the second shim between the first axle member and the second axle member and the second end of the wear member may be the at least the portion of the second portion of the second shim external to the first axle member. The wear member may be movable between a lock position and an adaptable position. The second axle member may be held in a position relative to the first axle member in the lock position, and the second axle member may be movable between the first position and the second position in the adaptable position.

The wear member may be movable between the lock position and the adaptable position by rotating the wear member.

The second end of the wear member may include a tool-receiving pocket that may be configured to receive a tool. The tool may be used to rotate the wear member between the lock position to the adaptable position.

The first end of the wear member may have a first average diameter and the second end of the wear member may have a second average diameter that is less than the first average diameter.

The second shim may further include a boss member having a first end and a second end. The first axle member may include an opening to receive the first end of the boss member. The boss member may include a cavity to receive the second end of the wear member. The second end of the boss member together with the second end of the wear member may define the second portion of the second shim.

The boss member may be formed integrally with the first axle member.

The boss member may be formed separately from the wear member.

The second shim may further include a locking member, and the boss member may include one or more grooves that receive at least a part of the locking member.

The locking member may include a perimeter member that surrounds the second end of the boss member and a crossing member that is supported by the perimeter member and received by the one or more grooves of the boss member and one or more openings of the wear member to hold the wear member in the lock position.

The two or more shims may further include a third shim, where at least a portion of the third shim may be between the first section of the first axle member and the third section of the second axle member and the first and third shims are fixed shims.

The third section of the second axle member may have a first angle surface and a second angle surface, and the first shim and the third shim may each have an angled surface shaped to engage the first and second angle surfaces of the third section of the second axle member.

The first axle member may have a general square shape or a general rectangular shape, where a first corner and a second opposing corner define the first section of the first axle member. The first corner may include the first shim, and the second corner may include the third shim.

The first shim and the third shim may be formed integrally with the first axle member.

The first shim and the third shim may be separate components coupled to the first axle member.

The first shim and the third shim may each include a body portion and a cushion member, where the body portion engages the first axle member and the cushion member engages the second axle member.

In various aspects, the present disclosure provides another example adjustable track-width system for an agricultural machine.

The adjustable track-width system may include a fixed axle member, an adjustable axle member, a first fixed shim, a second fixed shim, and an adjustable shim. The fixed axle member may have a first section and a second section, where the first section is defined by a first corner and a second corner. The adjustable axle member may have a third section and a fourth section. The adjustable axle member may be receivable by the fixed axle member and movable between a first position and a second position within the fixed axle member. The first fixed shim may be disposed at the first corner defining the first section of the fixed axle member. The second fixed shim may be disposed at the second corner defining the first section of the fixed axle member. At least a portion of the adjustable shim may be between the second section of the fixed axle member and the fourth section of the adjustable axle member. The adjustable shim may be movable between a lock position where the adjustable axle member is held in position relative to the fixed axle member and an adaptable position where the adjustable axle member is movable between the first position and the second position.

The at least the portion of the adjustable shim may be a first portion of the adjustable shim and the adjustable shim may further include a second portion that is on an exterior surface of the agricultural machine.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For the purposes of clarity, various dimensions of the drawings may have been exaggerated.

FIG. 2B is bottom-up view of the agricultural machine illustrated in FIG. 1 where the one or more adjustable axle members are in a second position in accordance with at least one example embodiment of the present disclosure.

DETAILED DESCRIPTION

Figure 1:
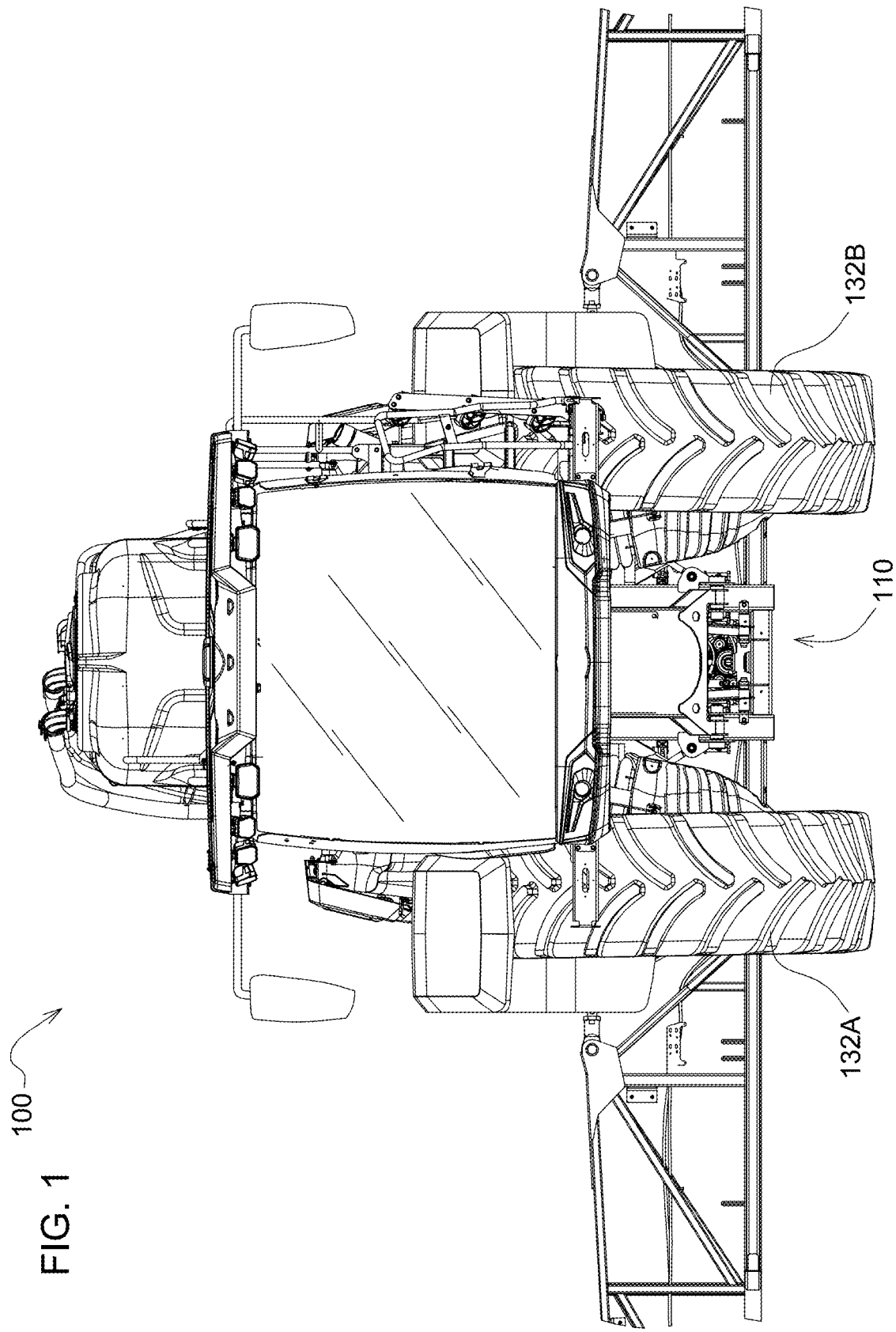
FIG. 1 is a front view of an example agricultural machine including one or more adjustable axle members in accordance with at least one example embodiment of the present disclosure.

Some detailed example embodiments are disclosed herein. However, specific structural and functional details disclosed herein are merely representative for the purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, component, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," specify the presence of stated features, integers, steps, operations, and/or elements, but do not preclude the presence or addition of one or more other features, integers, steps, operations, elements, and/or groups thereof.

When the terms "about" or "substantially" are used in this specification in connection with a numerical value, it is intended that the associated numerical value includes a manufacturing or operational tolerance (e.g., +10%) around the stated numerical value. Moreover, when the terms "generally" or "substantially" are used in connection with geometric shapes, it is intended that precision of the geometric shape is not required but that latitude for the shape is within the scope of the disclosure. Furthermore, regardless of whether numerical values or shapes are modified as "about," "generally," or "substantially," it will be understood that these values and shapes should be construed as including a manufacturing or operational tolerance (e.g., +10%) around the stated numerical values or shapes.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

At least some example embodiments of the present disclosure provide adjustable axles for agricultural machines. As used herein, agricultural machine may include, for example, self-propelled sprayers. Although agricultural machines are discussed herein, it should be appreciated that, in various other example embodiments, adjustable axles in accordance with the present disclosure may be used in other vehicles. The adjustable axles as detailed herein may be useful, for example, for automotive vehicles and/or mining vehicles and/or construction vehicles and/or utility vehicles. The adjustable axles as detailed herein may be useful, for example, for backhoe loaders, tractors, planters, sprayers, bulldozers, forklifts, steam roller road rollers or roller compactors, cranes, haul truck, underground graders, rock breakers, and the like.

FIG. 1 is a front view of an example agricultural machine 100. The agricultural machine 100 includes a chassis 110 which is a support frame that defines a longitudinal length of the agricultural machine 100 and provides a structure for mounting numerous other components of the agricultural machine 100. As further described below (e.g., FIGS. 2A-7), the agricultural machine 100 includes an adjustable track-width system 150 having one or more adjustable axle members 200A, 200B. Each of the one or more adjustable axle members 200A, 200B may be mechanically coupled to a respective wheel assembly of the agricultural machine 100, each of the wheel assemblies includes a wheel 132A, 132B and a hub 134A, 134B.

Figure 2A:
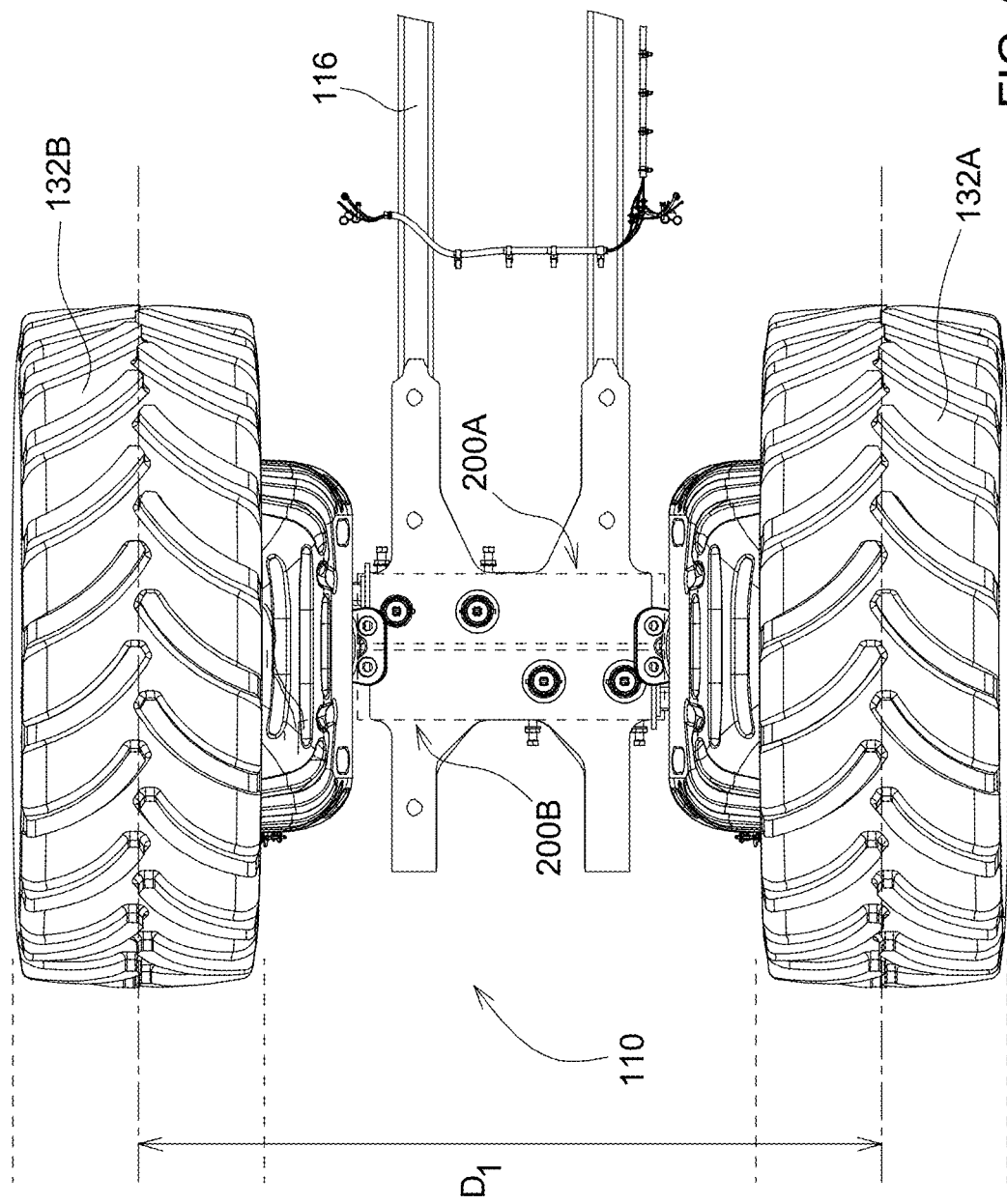
FIG. 2A is a bottom-up view of the agricultural machine illustrated in FIG. 1 where the one or more adjustable axle members are in a first position in accordance with at least one example embodiment of the present disclosure.

The one or more adjustable axle members 200A, 200B may each be movable between two or more track-width positions to accommodate various functions for different applications of the agricultural machine 100. For example, FIG. 2A is a bottom-up perspective view of the agricultural machine 100 illustrated in FIG. 1 where the one or more adjustable axle members 200A, 200B and the respective wheel members 132A, 132B are positioned in a first position (D1) in accordance with at least one example embodiment of the present disclosure. FIG. 2B is a bottom-up perspective view of the agricultural machine 100 illustrated in FIG. 1 where the one or more adjustable axle members 200A, 200B and the respective wheel members 132A, 132B are positioned in a second position (D2) in accordance with at least one example embodiment of the present disclosure. In the first position (D1), a first distance may span between the first wheel 132A of a first wheel assembly and the second wheel 132B of a second wheel assembly. In the second position (D2), a second distance may span between the first wheel 132A of the first wheel assembly and the second wheel 132B of the second wheel assembly. In at least one example embodiment, the second distance may be larger than the first distance. The first and second distances may be selected to accommodate different crop or line spacings.

Figure 3:
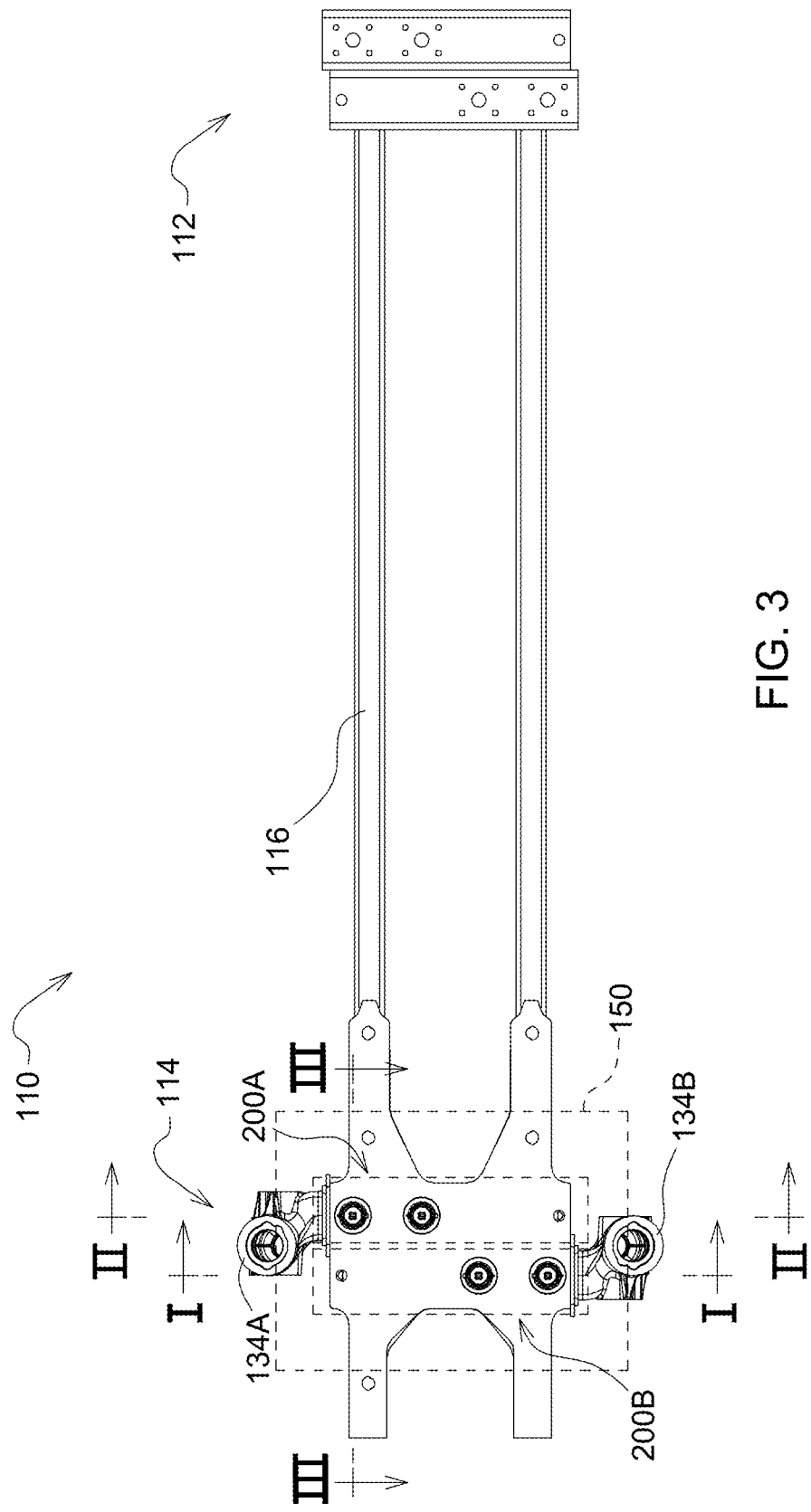
FIG. 3 is a bottom-up view of an example chassis for the agricultural machine illustrated in FIG. 1, the chassis including the one or more adjustable axle members in accordance with at least one example embodiment of the present disclosure.

FIG. 3 is a bottom-up perspective view of the chassis 110. The chassis 110 has a first end (or side or portion) 112 and a second end (or side or portion) 114 opposing the first end along a longitudinal axis of the chassis 110. The first end 112 of the chassis 110 is configured to support a first portion of the agricultural machine 100. The second end 114 is configured to support a second portion of the agricultural machine 100. The first and second ends 112, 114 of the chassis 110 may be connected by one or more supporting beams 116 and may be each fixedly secured to the respective first and second portions of the agricultural machine 100. For example, in at least one example embodiment, the chassis 110 may include two supporting beams 116. Although two supporting beams 116 are illustrated, it should be appreciated that, in various other example embodiments, the chassis 110 may include one or more supporting beams 116. In at least one example embodiment, the one or more supporting beams 116 may extend in a longitudinal direction of the chassis 110.

The second end 114 of the chassis 110 includes the one or more adjustable axle members 200A, 200B. For example, in at least one example embodiment, the chassis 110 may include a first adjustable axle member 200A configured to be mechanically coupled to a first wheel assembly including the first wheel 132A and a second adjustable axle member 200B configured to be mechanically coupled to a second wheel assembly including the second wheel 132B. In at least one example embodiment, the first adjustable axle member 200A may be substantially parallel with the second adjustable axle member 200B and the first and second adjustable axle members 200A, 200B may be crosswise relative to the longitudinal direction of the chassis 110 (and/or supporting beams 116). Although placed differently, the first and second adjustable axle members 200A, 200B have the same configuration.

Although two adjustable axle members 200A, 200B are illustrated, and discussed herein, it should be appreciated that, in various other example embodiments, the chassis 110 may include one or more adjustable axle members. Further, although only the second end 114 of the chassis 110 is illustrated as including the one or more adjustable axle members 200A, 200B, it should be appreciated that, in various other example embodiments, both ends of the chassis 110 (including the first end 112 and/or the second end 114) may include one or more adjustable axle members that are like the one or more adjustable axle members 200A, 200B illustrated and described herein.

Figure 4:
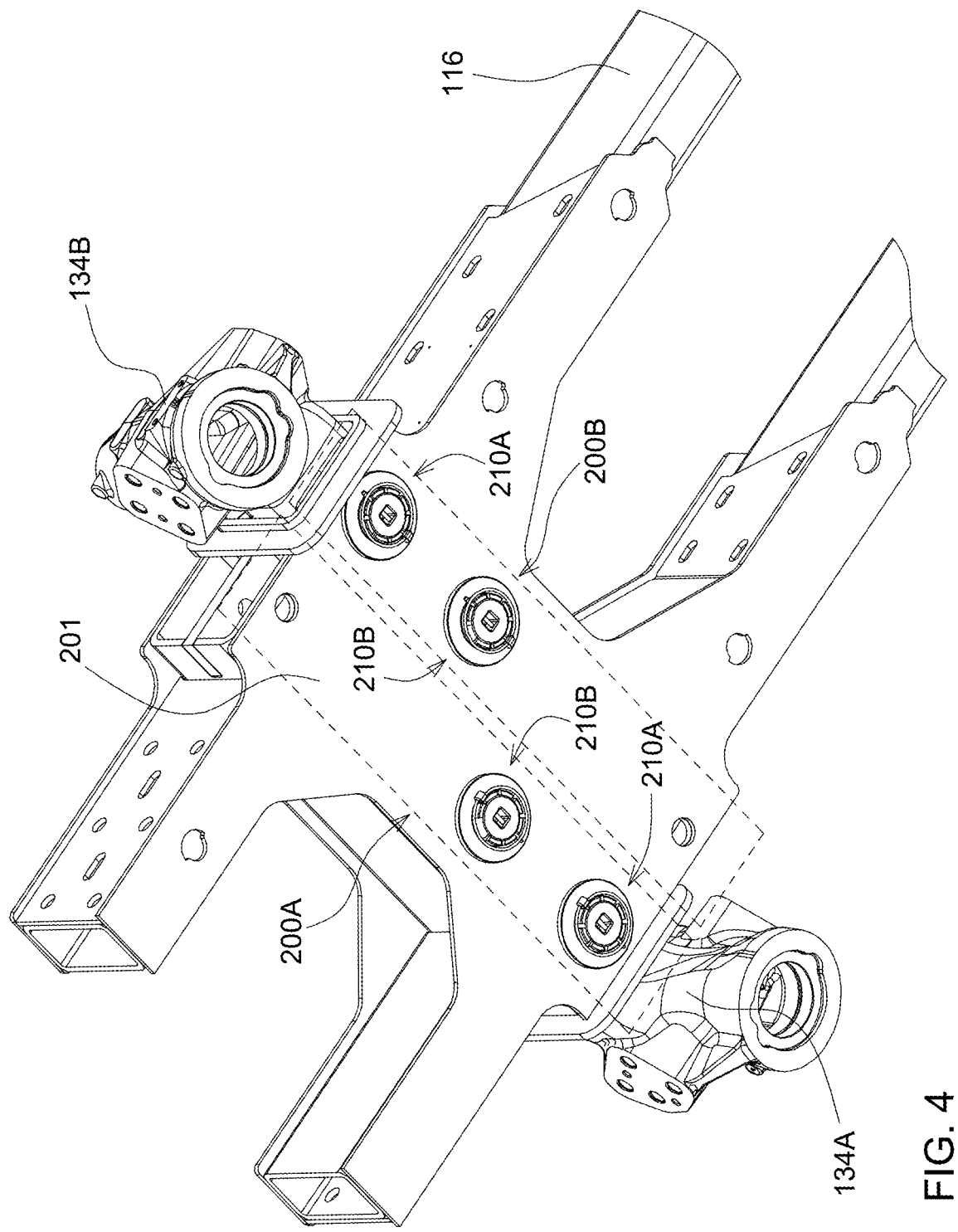
FIG. 4 is a bottom-up perspective, partial view of the chassis illustrated in FIG. 3, each of the one or more adjustable axle members including one or more adjustable shims having wear surfaces in accordance with at least one example embodiment of the present disclosure.

FIG. 4 is a bottom-up perspective view of the chassis 110. In at least one example embodiment, each of the adjustable axle members 200A, 200B includes one or more adjustable (or movable) shims 210A, 210B that are configured to help determine (or define) a gap (or space) between interior and exterior axle members 242, 244, which are detailed below (see, e.g., FIGS. 5A and 5B). For example, in at least one example embodiment, the one or more adjustable shims 210A, 210B may provide wear surfaces (e.g., wear member 330 as illustrated in FIGS. 5-7, 10A-10B, and 12A-12B) that are adjustable in height to reduce clearances between the interior and exterior axle members 242, 244. The one or more one or more adjustable shims 210A, 210B determine (or define) the gap between interior and exterior axle members 242, 244 in both the first position as illustrated in FIG. 2A and the second position as illustrated in FIG. 2B and also in any position therebetween. By reducing the gap between the interior and exterior axle members 242, 244, vibrations may be reduced and/or minimized.

In at least one example embodiment, the one or more adjustable shims 210A, 210B each have a low profile relative to a major surface 201 of the chassis 110 such that the adjustable shims 210A, 210B do not interfere with the function of the agricultural machine 100, for example, when the agricultural machine 100 is used in the instance of mature crops.

In at least one example embodiment, each of the adjustable axle members 200A, 200B may include a first adjustable shim 210A and a second adjustable shim 210B. Although two adjustable shims 210A, 210B are illustrated, it should be appreciated that, in various other example embodiments, the each of the adjustable axle members 200A, 200B may include one or more adjustable shims.

In at least one example embodiment, the one or more adjustable shims 210A, 210B may be located near the respective the respective wheel assembly. For example, as illustrated, the first adjustable shim 210A and the second adjustable shim 210B of the first adjustable axle member 200A may be located nearer to the first hub 134A of the first wheel assembly than to the second hub 134B of the second wheel assembly. Similarly, the first adjustable shim 210A and the second adjustable shim 210B of the second adjustable axle member 200B may be located nearer to the second hub 134B of the second wheel assembly than to the first hub 134A of the second wheel assembly. That is, the first adjustable axle member 200A may include a first pair of adjustable shims 210A, 210B and the second adjustable axle member 200B may include a second pair of adjustable shims 210A, 210B. Although the adjustable shims 210A, 210B are illustrated in each instances as being nearer to the respective wheel assembly, it should be appreciated that, in various other example embodiments, the adjustable shims 210A, 210B may be at various positions along a length of the respective adjustable axle members 200A, 200B. Further although the adjustable shims 210A, 210B are illustrated as being adjacent to one another, it should be appreciated that, in various other example embodiments, the adjustable shims 210A, 210B may be located at different sections (or portions) along the length of the respective adjustable axle members 200A, 200B.

Figure 5A:
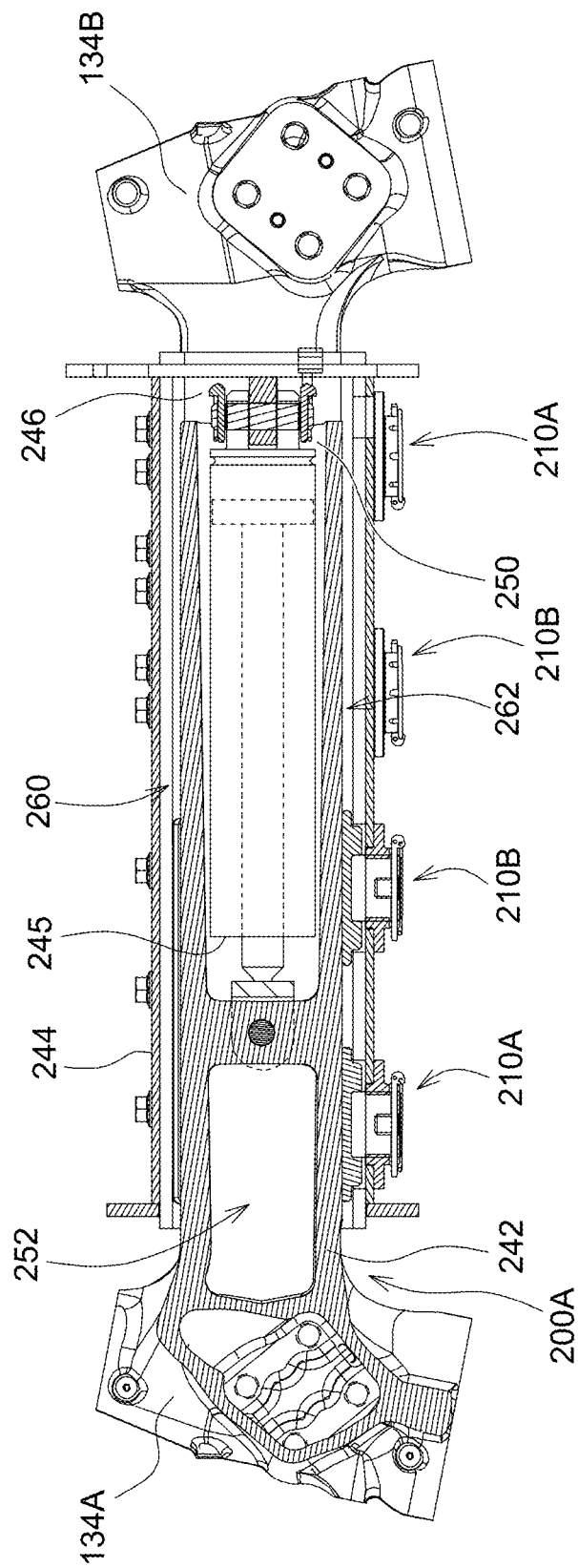
FIG. 5A is a cross-section view (along line I-I) of a first adjustable axle member of the one or more adjustable axle members as illustrated in FIGS. 3 and 4, where the first adjustable axle member includes a first axle member and a second axle member in accordance with at least one example embodiment of the present disclosure.
Figure 5B:
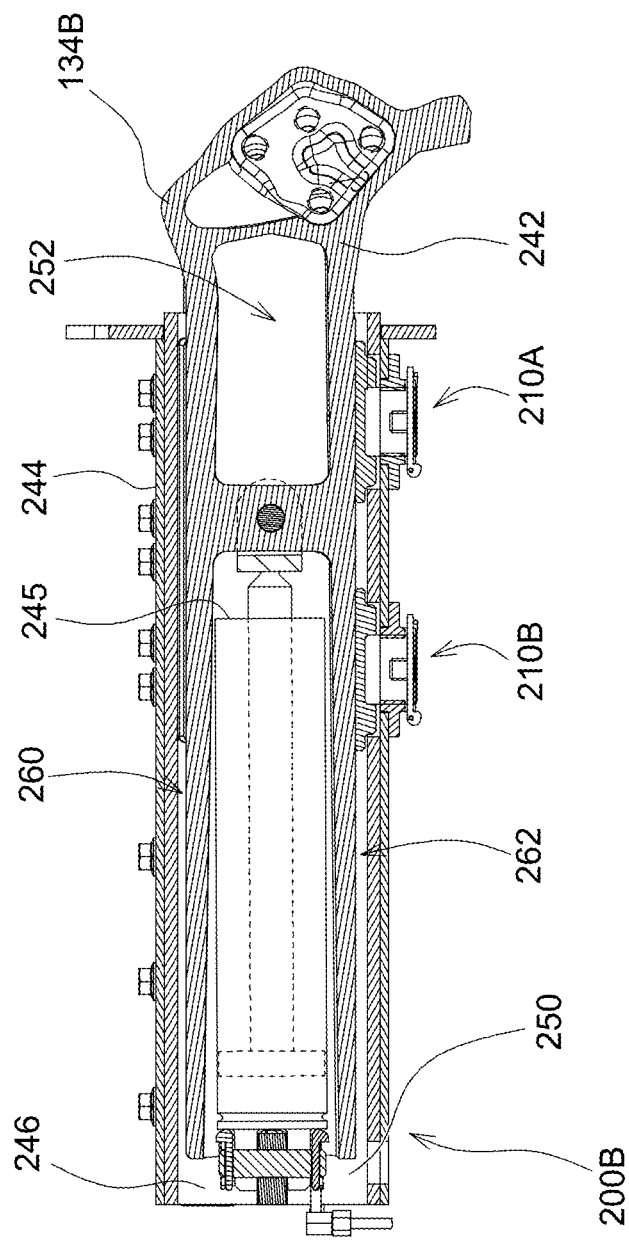
FIG. 5B is a cross-section view (along line II-II) of a second adjustable axle member of the one or more adjustable axle members as illustrated in FIGS. 3 and 4, where like the first adjustable axle member illustrated in FIG. 5A, the second adjustable axle member includes a first axle member and a second axle member in accordance with at least one example embodiment of the present disclosure.
Figure 6:
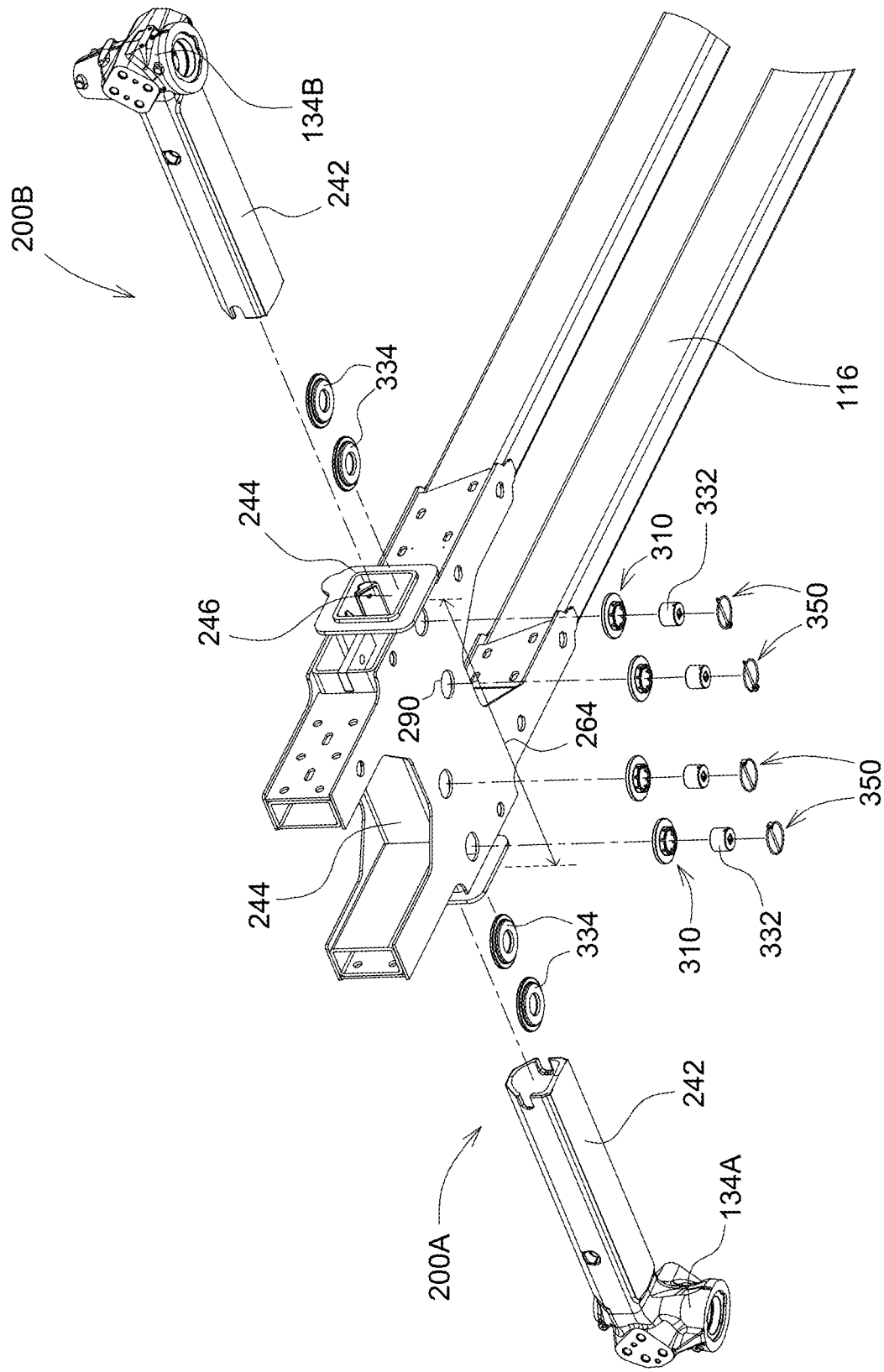
FIG. 6 is an exploded view of the first and second adjustable axle members as illustrated in FIGS. 5A and 5B in accordance with at least one example embodiment of the present disclosure.

FIG. 5A is a cross-section view (along line I-I) of the first adjustable axle member 200A as illustrated in FIGS. 3 and 4. FIG. 5B is a cross-section view (along line II-II) of the first adjustable axle member 200B as illustrated in FIGS. 3 and 4. FIG. 6 is an exploded view of the first and second adjustable axle members 200A, 200B as illustrated in FIGS. 5A and 5B.

Each of the one or more adjustable axle members 200A, 200B includes a first (or internal or inner or interior) axle member 242 and second (or external or outer or exterior) axle member 244. For example, at least a portion of the internal axle member 242 may be received by the external axle member 244. In at least one example embodiment, the external axle member 244 may be a fixed axle member while the internal axle member 242 is a movable axle member that moves (e.g., slides) within the external axle member 244. In at least one example embodiment, the internal axle member 242 may be moveable (for example, between the first position (D1) illustrated in FIG. 2A and the second position (D2) illustrated in FIG. 2B) using a hydraulic cylinder 245. The hydraulic cylinder 245 may also be configured to hold the internal axle member 242 in position relative to the external axle member 244. The external axle member 244 may be fixedly secured to, or formed integrally with, at least one of the one or more support beams 116. A first end (or side or portion) 250 of the internal axle member 242 may be received and maintained within the external axle member 244, while an opposing second end (or side or portion) 252 of the internal axle member 242 is couplable to, or integrally formed with, the hub 134A, 134B of the respective wheel assembly.

Figure 7:
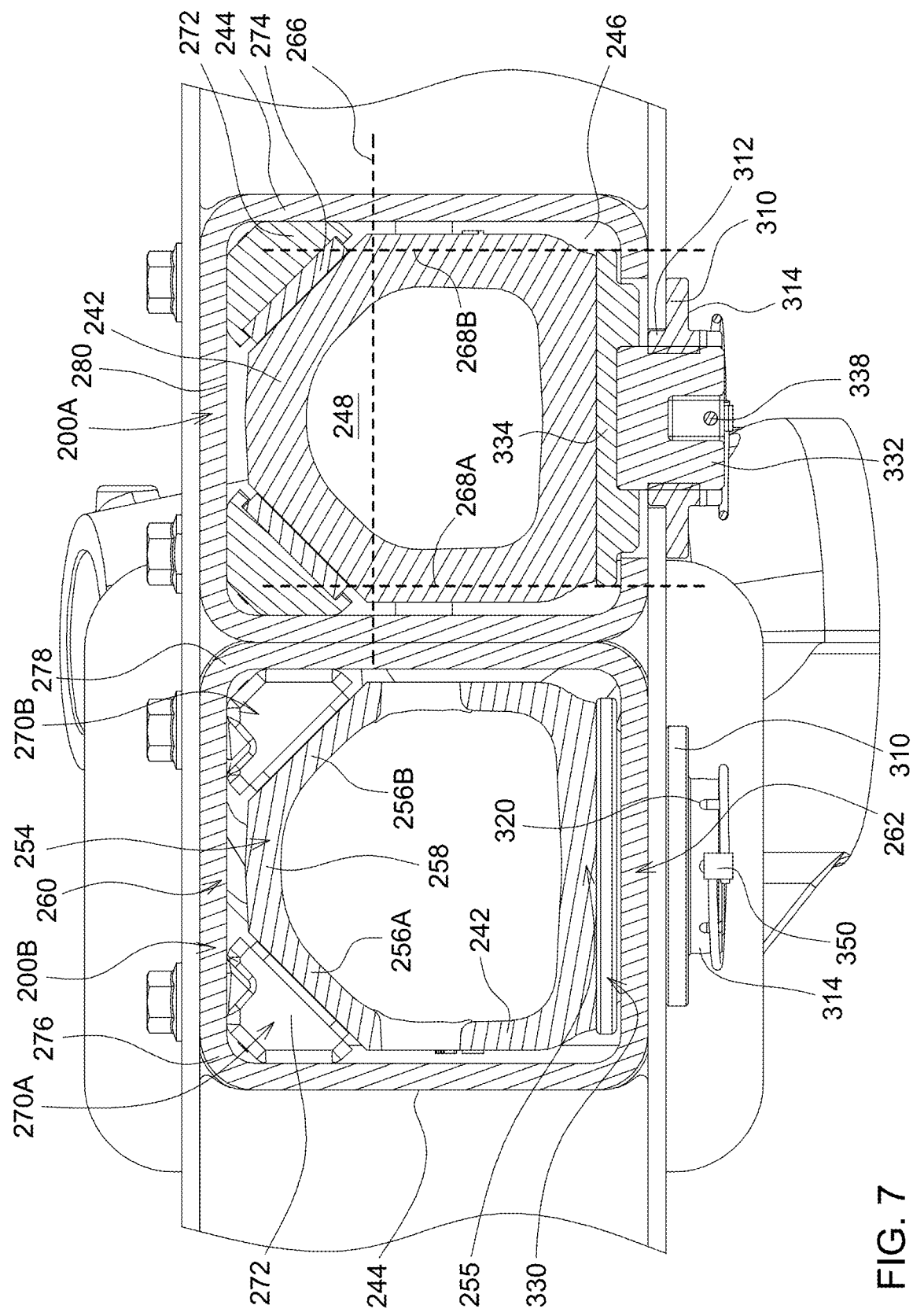
FIG. 7 is a cross-sectional view (along line III-III) of a second end of the chassis including the one or more adjustable axle members as illustrated in FIGS. 3 and 4 in accordance with at least one example embodiment of the present disclosure.

FIG. 7 is a cross-sectional view (along line III-III) of the second end 114 of the chassis 110 including the first and second adjustable axle members 200A, 200B as illustrated in FIGS. 3 and 4.

The external axle member 244 may be a hollow structure having a first (or top) end (or side or portion or section) 260 and a second (or bottom) end (or side or portion or section) 262. In at least one example embodiment, the first end 260 of the external axle member 244 may include (e.g., coupled to or formed integrally therewith) one or more fixed shims 270A, 270B while the second end 262 of the external axle member 244 may include the one or more adjustable (or movable) shim 210A, 210B.

In at least one example embodiment, the one or more fixed shims 270A, 270B project inwardly from a perimeter of the external axle member 244 to help to shape the hollow cavity 246 of the external axle member 244. The one or more fixed shims 270A, 270B may extend along a length 264 of the external axle member 244. For example, in at least one example embodiment, the one or more fixed shims 270A, 270B may extend along greater than or equal to about 20% (e.g., greater than or equal to about 25%, greater than or equal to about 30%, greater than or equal to about 35%, greater than or equal to about 40%, greater than or equal to about 45%, greater than or equal to about 50%, greater than or equal to about 55%, greater than or equal to about 60%, greater than or equal to about 65%, greater than or equal to about 70%, greater than or equal to about 75%, greater than or equal to about 80%, greater than or equal to about 85%, greater than or equal to about 90%, or greater than or equal to about 95%) of a total length of the external axle member 244.

In at least one example embodiment, the one or more fixed shims 270A, 270B may each include a structural member (or body) 272 and one or more cushion (or wear) members 274 disposed on along the body 272 to interface with the internal axle member 242 received within the cavity 246 of the external axle member 244. In at least one example embodiment, the structural member 272 may be separate components coupled (or secured) to the external axle member 244. In other example embodiments, the structural member 272 may be formed integrally with the external axle member 244. In each instance, the cushion member 274 is corrosion resistant and has a softness greater than that of the structural member 272 and/or external axle member 244.

In at least one example embodiment, the external axle member 244 may have a cuboid shape and an overall (or outer) square or rectangular cross-sectional shape. The square or rectangular shape may be a rounded-corner square or rectangular shape. The square or rectangular shape include a first corner (or surface) 276 and a second corner (or surface) 278 that together define the first side 260 of the external axle member 244. Although a cuboid shape and a square or rectangular cross-sectional shape is illustrated, it should be appreciated that, in various other example embodiments, the external axle member 244 may have various other shapes and/or cross-sections.

In at least one example embodiment, the external axle member 244 includes a first fixed shim 270A at the first corner 276 and a second fixed shim 270A at the opposing second corner 278. The body 272 of the fixed shims 270A, 270B may be shaped to correspond with the respective corner 276, 278. For example, in at least one example embodiment, the fixed shims 270A, 270B may have a generally triangular shape. Although a triangular shape is illustrated, it should be appreciated that, in various other example embodiments, the fixed shims 270A, 270B may have various other shapes. Although two fixed shims 270A, 270B are illustrated it should be appreciated that, in various other example embodiments, the external axle member 244 may include one or more fixed shims.

In at least one example embodiment, the internal axle member 242 has an overall (or outer) shape configured to be received by the external axle member 244 and to engage with the fixed shims 270A, 270B and also the adjustable shims 210A, 210B. For example, the internal axle member 242 may include a third (or top) end (or side or portion or section) 254 having one or more surfaces 256A, 256B configured to engage with the one or more fixed shims 270A, 270B, respectively, and an opposing fourth (or bottom) end (or side or portion or section) 255 configured to engage with the adjustable shims 210A, 210B.

In at least one example embodiment, the top end 254 of the internal axle member 242 may have a first angled surface 256A configured to engage with the first fixed shim 270A and a second angled surface 256B configured to engage with the second fixed shim 270B. In at least one example embodiment, an angled portion (e.g., hypotenuse) of the first fixed shim 270A of the external axle member 244 and the corresponding first angle surface 256A of the internal axle member 242 may each have an angle of greater than or equal to about 35 degrees to less than or equal to about 55 degrees (e.g., about 45 degrees) between $y_1$-axis 268A and x-axis 266. In at least one example embodiment, as angled portion (e.g., hypotenuse) of the second fixed shim 270B of the external axle member 244 and the corresponding second angle surface 256B of the internal axle member 242 may each have an angle of greater than or equal to about 35 degrees to less than or equal to about 55 degrees (e.g., about 45 degrees) between $y_2$-axis 268B and the x-axis 266. In at least one example embodiment, the angle of the first and second angle surfaces 256A, 256B of the internal axle member 242, and therefore also the angled portions of the first and second fixed shims 270A, 270B are selected to bias the load of the internal axle member 242.

In at least one example embodiment, the internal axle member 242 may include a planar surface 258 that joins together the first and second angled surfaces 256A, 256B. The planar surface 258 of the internal axle member 242 may be substantially parallel with a portion 280 of the first end 260 of the external axle member 244 between the first and second fixed shims 270A, 270B. Like the external axle member 244, in at least one example embodiment, the internal axle member 244 may be a hollow structure including a cavity 248. For example, the internal axle member 244 may be a hollow structure having a first (or top) end (or side or portion or section) and a second (or bottom) end (or side or portion or section) and sidewalls connecting the same to define the internal axle member 244. The hollow structure of the internal axle member 244 may reduce material requirements and reduced production costs without reducing form and strength.

In at least one example embodiment, the second end 262 of the external axle member 244 includes an opening 290 configured to receive the respective adjustable shim 210A, 210B allowing the adjustable shim 210A, 210B to engage with the bottom end 255 of the internal axle member 242. Each of the adjustable shims 210A, 210B may include a boss member 310, a wear (or puck) member 330, and a locking member 350. As least a portion of the boss member 310 (e.g., a first (or internal) end (or section or portion) 312 of the boss member 310) is shaped to be received by and secured in the opening 290 of the external axle member 244. In at least one example embodiment, the boss member 310 may be separable from the external axle member 244. For example, the boss member 310 may be coupled (or secured) to the external axle member 244 using one or more couplers (or fasteners), such as an adhesive thread lock. In other example embodiments, the boss member 310 may be formed integrally with (e.g., welded to) the external axle member 244. In other example embodiments, the boss member 310 may be press-fit into the external axle member 244. In each instance, however, the boss member 310 does not rotate once secured.

Figure 8A:
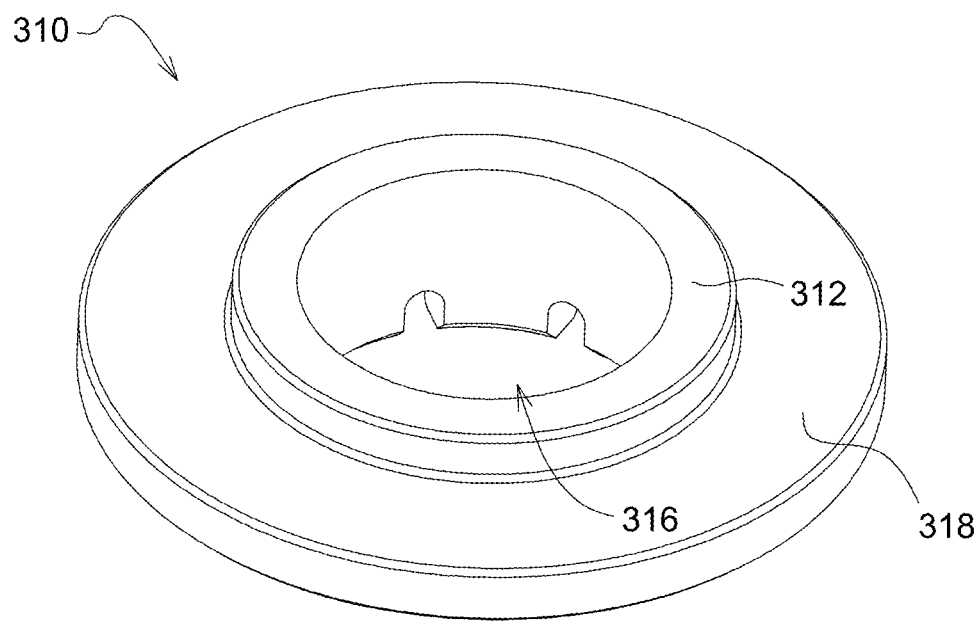
FIG. 8A is a top-down perspective view of an example boss member of the one or more adjustable shims as illustrated in FIG. 4 in accordance with at least one example embodiment of the present disclosure.
Figure 8B:
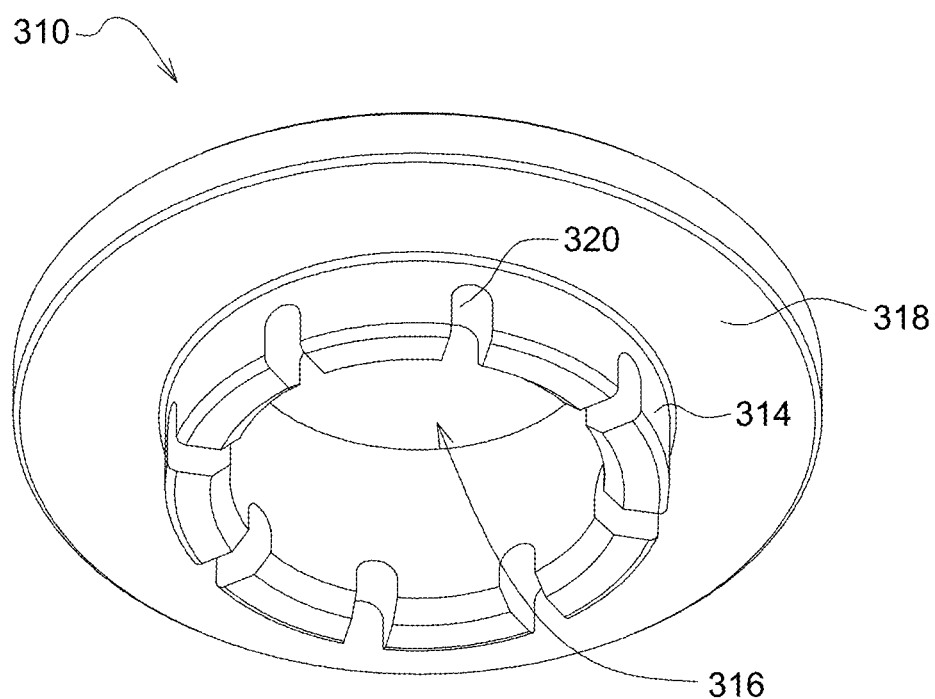
FIG. 8B is a bottom-up perspective view of the boss member of FIG. 8A in accordance with at least one example embodiment of the present disclosure.
Figure 9:
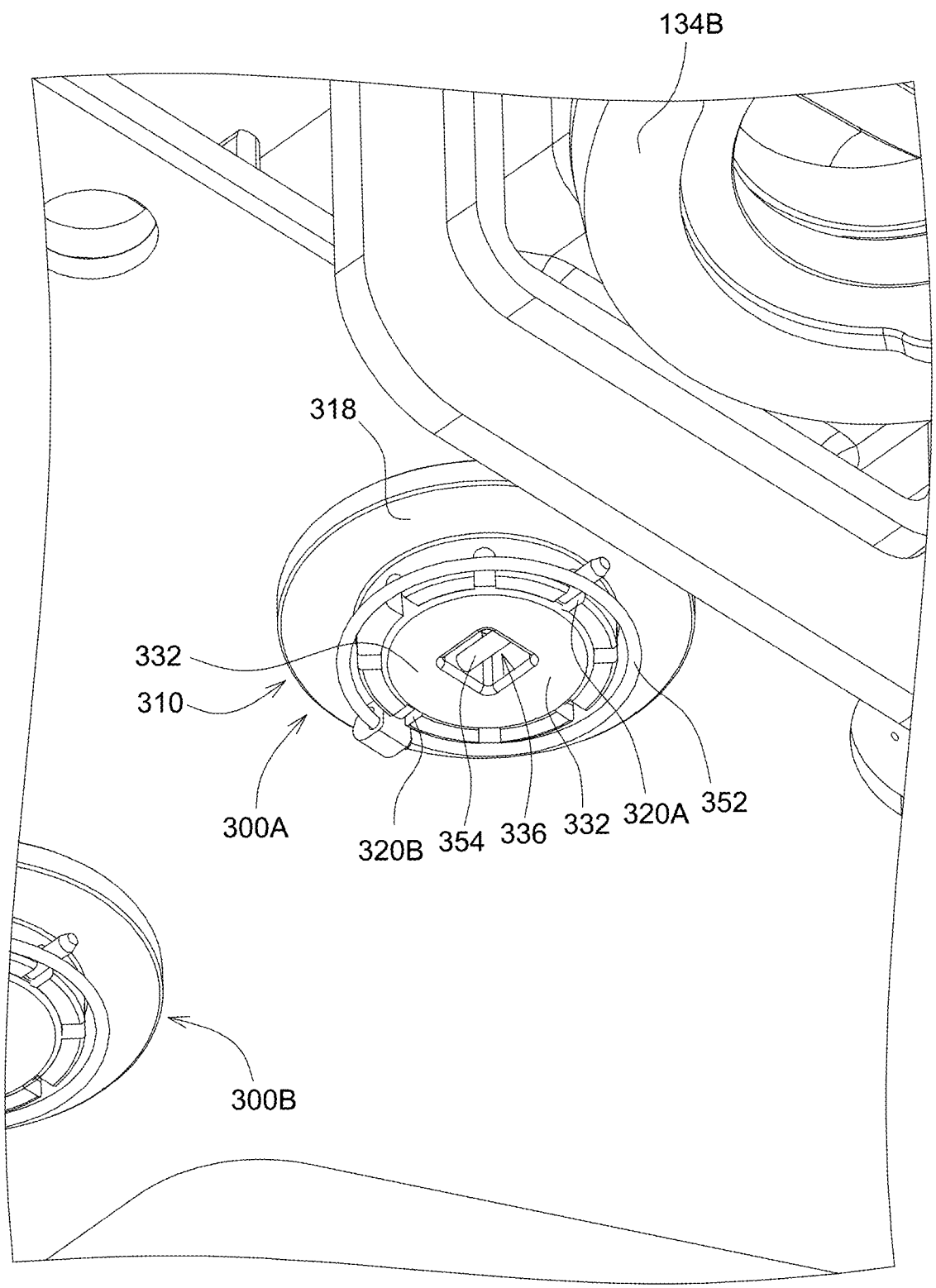
FIG. 9 is a partial bottom-up, perspective external view of the one or more adjustable shims as illustrated in FIG. 4 in accordance with at least one example embodiment of the present disclosure.

FIG. 8A is a top-down perspective view of the boss member 310. FIG. 8B is a bottom-up perspective view of the boss member 310. FIG. 9 is partial bottom-up, perspective external view of the adjustable shims 210A, 210B. In at least one example embodiment, the boss member 310 includes a cavity 316 configured to receive at least a portion (e.g., a first (or bottom) end (or section or portion) 332) of the wear member 330, while another portion (e.g., a second (or bottom or external) end (or section or portion) 314 opposing the top end 312) of the boss member 310 is configured to engage with the locking member 350. For example, in at least one example embodiment, the bottom end 314 of the boss member 310 may include one or more grooves 320 that are configured to interact with the locking member 350.

In at least one example embodiment, the boss member 310 may further include an intermediate collar (or portion or section) 318 between the top and bottom ends 312, 314 of the boss member 310. In at least one example embodiment, the intermediate collar 318 may be secured against the major surface 201 of the chassis 110. In at least one example embodiment, intermediate collar 319 may have a diameter that is sufficient to drive the load to the corners of the external axle member 244 and/or the internal axle member 242. In at least one example embodiment, the boss member 310 is prepared using a material have a first stiffness, while major surface 201 of the chassis 110 and/or the external axle member 244 are prepared using a material having a second stiffness that is greater than the first stiffness.

Figure 10A:
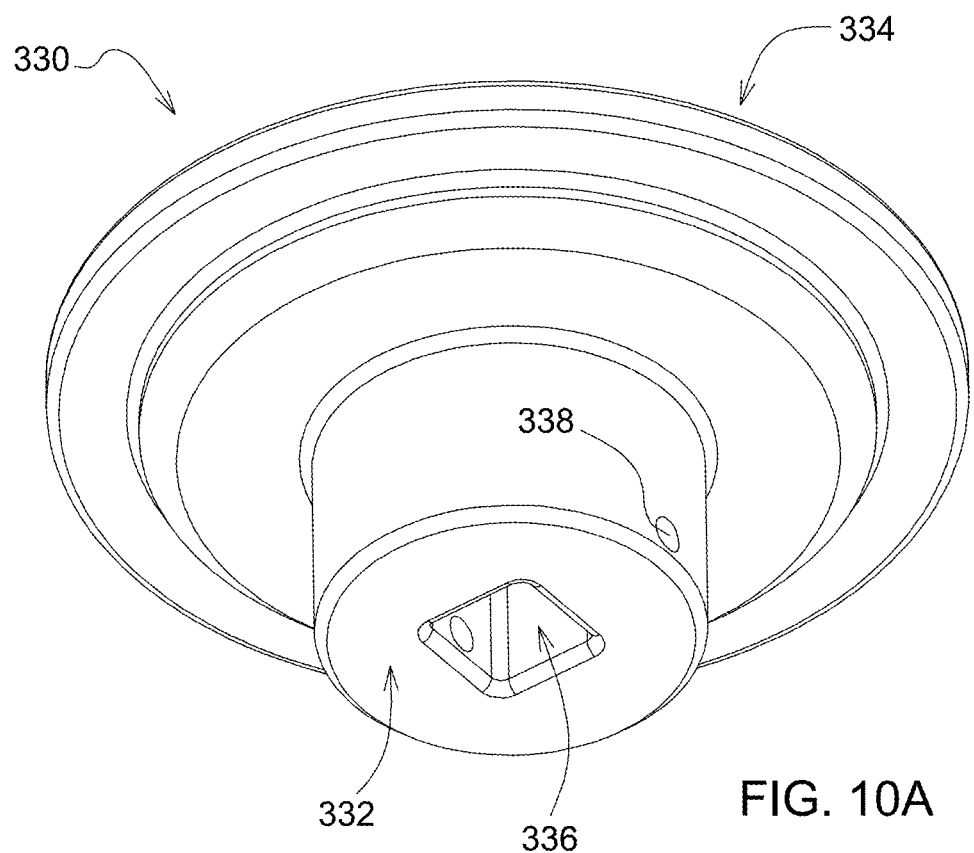
FIG. 10A is a bottom-up perspective view of an example wear member for use with the one or more adjustable shims as illustrated in FIG. 4 in accordance with at least one example embodiment of the present disclosure.
Figure 10B:
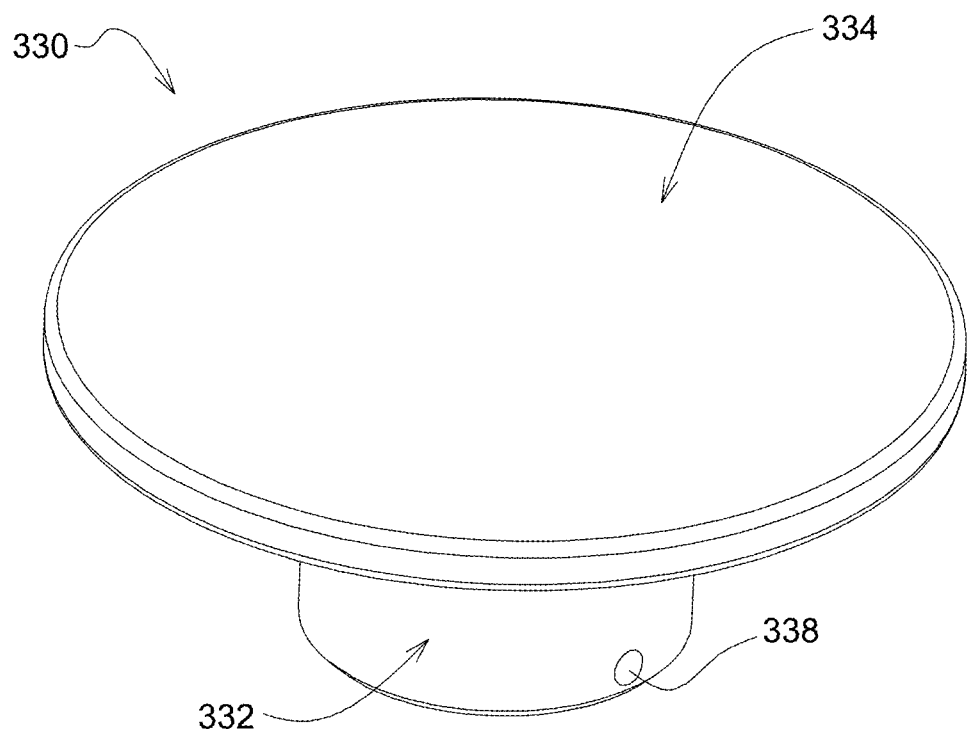
FIG. 10B is a top-down perspective view of the wear member of FIG. 10B in accordance with at least one example embodiment of the present disclosure.

FIG. 10A is a bottom-up perspective view of the (single piece) wear member 330. FIG. 10B is a top-down perspective view of the (single piece) wear member 330. The wear member 330 has a first (or bottom) end (or section or portion) 332 that is configured (e.g., shaped) to be at least partially received within the cavity 316 of the boss member 310 and a second (or top) end (or section or portion) 334 that is configured to engage with the internal axle member 242. For example, as best illustrated, for example, in FIG. 7, the top end 334 of the wear member 330 may be disposed between the bottom end 255 of the internal axle member 242 and the boss member 310 and/or external axle member 244.

The first end 332 of the wear member 330 may have a first average diameter. In at least one example embodiment, the first average diameter may be selected such that that portion of the wear member 330 is receivable by the cavity 316 of the boss member 310. The second end 334 of the wear member 330 may have a second average diameter. In at least one example embodiment, the second average diameter may be larger than the first average diameter. The second end 334 of the wear member 330 engages with the internal axle member 242, for example, by cushioning the internal axle member 242 relative to the external axle member 244 and/or boss member 310, and alternatively, or additionally, by applying a pressure to the internal axle member 242 relative to the one or more fixed shims 270A, 270B to minimize the gap between the external axle member 244 and the internal axle member 242. In at least one example embodiment, the second average diameter may be determined by the force being carried, the factors of surface area, coefficient of friction, and/or load and hydraulic cylinder force.

In at least one example embodiment, the first end 332 of the wear member 330 is configured to receive a tightening tool that can be used to move the wear member 330 between different positions. For example, rotative movement of the tightening tool in a first direction may move the wear member 330 towards and eventually against the internal axle member 242 to support the internal axle member 242 in the selected position, while rotative movement of the tightening tool in a second direction opposing the first direction may move the wear member 330 away from and towards the external axle member 244 allowing the internal axle member 242 to be moved within the external axle member 244 by the hydraulic cylinder 245. In at least one example embodiment, the first end 332 of the wear member 330 may include cavity (or pocket) 336 that is shaped to correspond, for example, with a square drive of a socket wrench and/or a drive socket. The wear member 330 is held in a position relative to the internal axle member 242 by the corporation of the locking member 350 and the boss member 310. In at least one example embodiment, the wear member 330 may include one or more openings 338 that are configured to receive one or more portions of the locking member 350.

Figure 11A:
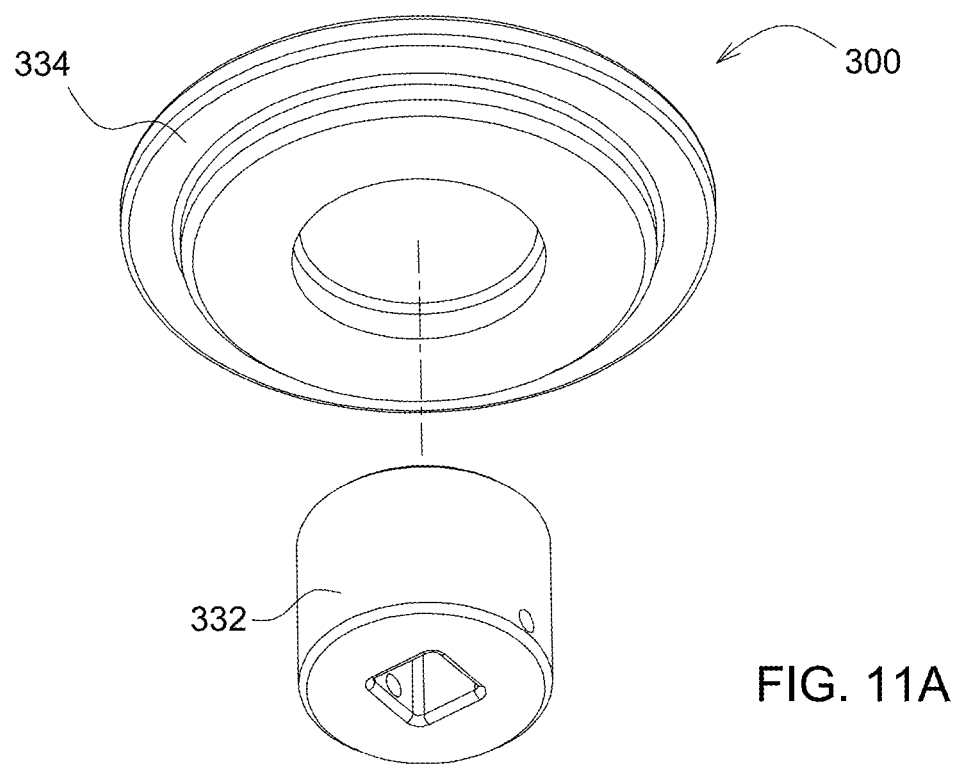
FIG. 11A is a bottom-up perspective view of another example wear member for use with the one or more adjustable shims as illustrated in FIG. 4 in accordance with at least one example embodiment of the present disclosure.
Figure 11B:
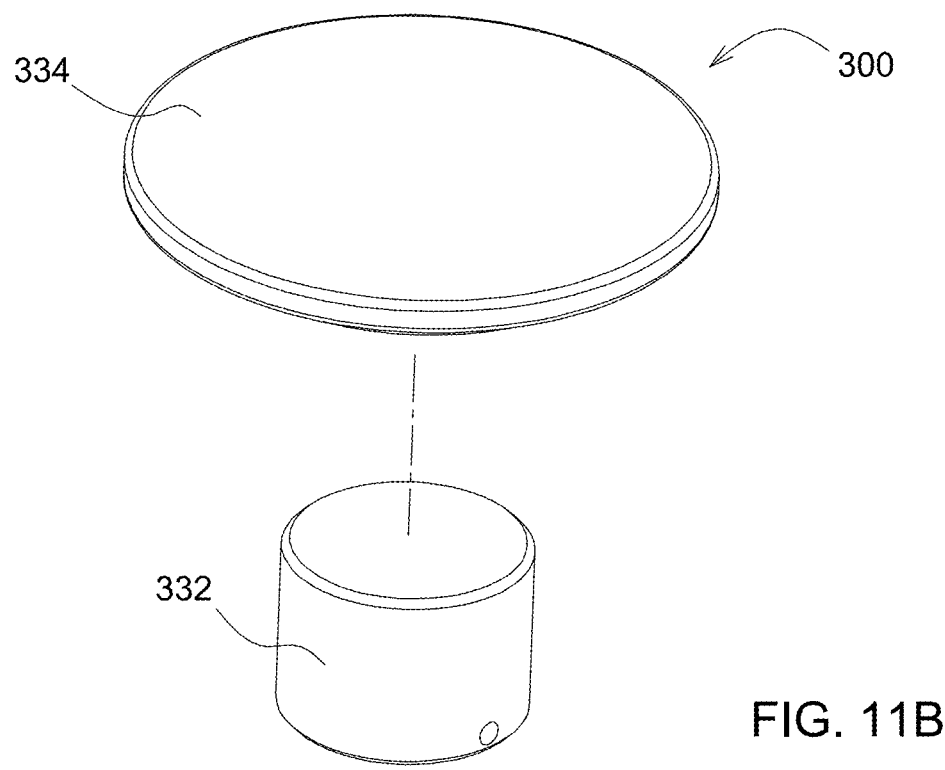
FIG. 11B is a top-down perspective view of the wear member of FIG. 11A in accordance with at least one example embodiment of the present disclosure.

Although the wear member 330 is illustrated in FIGS. 10A and 10B as being a single piece, it should be appreciated that, in various other example embodiments, the wear member 330 may include two or more pieces. For example, in at least one example embodiment, the first end 332 of the wear member 330 may define a first distinct piece of the ear member 330 and the second end 334 of the wear member 330 may define a second distinct piece as illustrated in FIGS. 11A and 11B. FIG. 11A is a bottom-up perspective view of the two-piece wear member 330. FIG. 11B is a top-down perspective view of the two-piece wear member 330.

Figure 12:
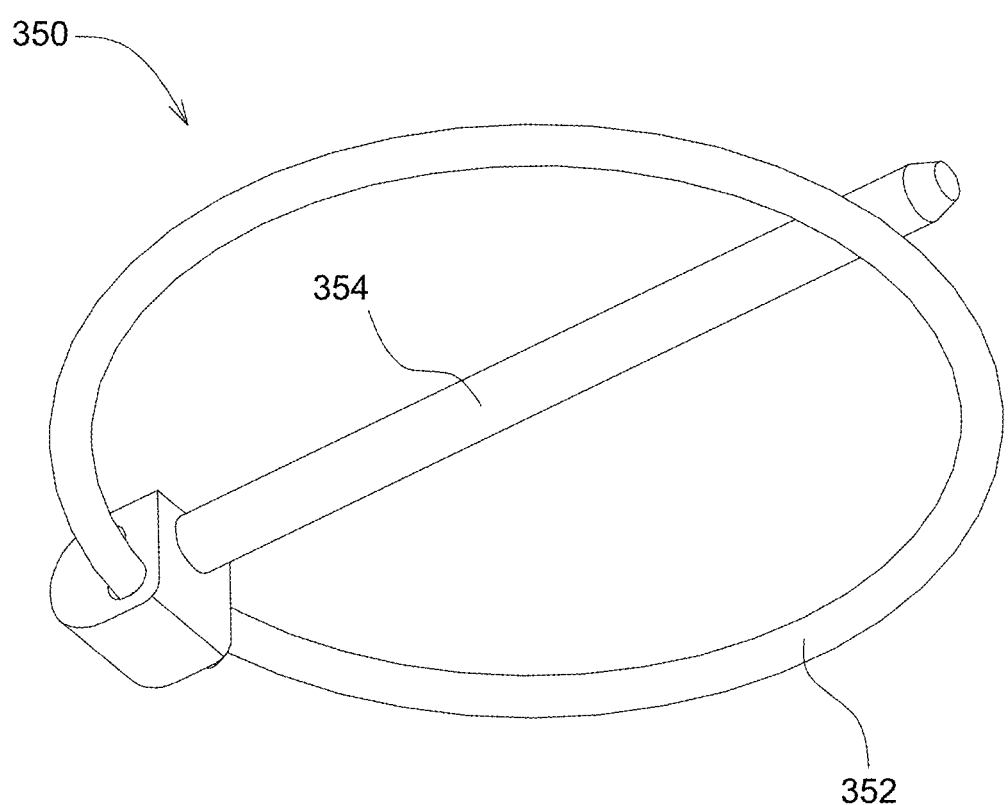
FIG. 12 is a perspective view of a locking member of the one or more adjustable shims as illustrated in FIG. 4 in accordance with at least one example embodiment of the present disclosure.

FIG. 12 is a perspective view of the locking member 350. In at least one example embodiment, the locking member 350 includes a perimeter structure 352 and a crossing member 354 that is supported by the perimeter structure 352. In at least one example embodiment, as best illustrated, for example, in FIG. 9, the perimeter structure 352 of the locking member 350 may be sized to surround the bottom end 314 of the boss member 310, while the crossing member 354 is received by and extends through the openings 338 of the wear member 330 and also through the cavity 336 of the wear member 330. The one or more grooves 320 of the boss member 310 may also be configured, to receive at least a portion of the crossing member 354. For example, in at least one example embodiment, the one or more grooves 320 of the boss members 310 may include one or more pairs of grooves 320A, 320B, where the corresponding grooves 320A, 320B receive opposing ends of the crossing member 354 and hold the crossing member 354 (and thereby also the wear member 330 and the internal axle member 242) in the select position.

While some example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

Although described with reference to specific examples and drawings, modifications, additions, and substitutions of example embodiments may be variously made according to the description by those of ordinary skill in the art. For example, the described techniques may be performed in an order different with that of the methods described, and/or elements such as the described system, architecture, devices, circuit, and the like, may be connected or combined to be different from the above-described methods, or results may be appropriately achieved by other elements or equivalents.

The invention claimed is:

1. An adjustable track-width system for an agricultural machine, the adjustable track-width system comprising:
   a first axle member having a first section and a second section;
   a second axle member having a third section and a fourth section, the second axle member receivable by the first axle member and movable between a first position and a second position relative to the first axle member; and
   two or more shims that determine a clearance between the first axle member and the second axle member at the first and second positions, the two or more shims including,
      a first shim, at least a portion of the first shim between the first section of the first axle member and the third section of the second axle member, and
      a second shim, at least a portion of the second shim between the second section of the first axle member and the fourth section of the second axle member.

2. The adjustable track-width system of claim 1, wherein the at least the portion of the second shim is a first portion of the second shim, and the second shim further includes a second portion that is external to the first axle member.

3. The adjustable track-width system of claim 2, wherein the second portion of the second shim engages with an exterior surface of the agricultural machine.

4. The adjustable track-width system of claim 2, wherein the second shim includes a wear member, the wear member has a first end and an opposing second end, the first end of the wear member is the at least the portion of the first portion of the second shim between the first axle member and the second axle member, the second end of the wear member is the at least the portion of the second portion of the second shim external to the first axle member, the wear member is movable between a lock position and an adaptable position, the second axle member is held in a position relative to the first axle member in the lock position, and the second axle member is movable between the first position and the second position in the adaptable position.

5. The adjustable track-width system of claim 4, wherein the wear member is movable between the lock position and the adaptable position by rotating the wear member.

6. The adjustable track-width system of claim 5, wherein the second end of the wear member includes a tool-receiving pocket configured to receive a tool.

7. The adjustable track-width system of claim 4, wherein the first end of the wear member has a first average diameter and the second end of the wear member has a second average diameter that is less than the first average diameter.

8. The adjustable track-width system of claim 4, wherein the second shim further includes a boss member having a first end and a second end, the first axle member includes an opening to receive the first end of the boss member, the boss member includes a cavity to receive the second end of the wear member, and the second end of the boss member together with the second end of the wear member define the second portion of the second shim.

9. The adjustable track-width system of claim 8, wherein the boss member is formed integrally with the first axle member.

10. The adjustable track-width system of claim 8, wherein the boss member is formed separately from the wear member.

11. The adjustable track-width system of claim 8, wherein the second shim further includes a locking member, and the boss member includes one or more grooves that receive at least a part of the locking member.

12. The adjustable track-width system of claim 11, wherein the locking member includes:
a perimeter member that surrounds the second end of the boss member; and
a crossing member that is supported by the perimeter member and received by the one or more grooves of the boss member and one or more openings of the wear member to hold the wear member in the lock position.

13. The adjustable track-width system of claim 1, wherein the two or more shims further includes a third shim, at least a portion of the third shim is between the first section of the first axle member and the third section of the second axle member, the first and third shims are fixed shims.

14. The adjustable track-width system of claim 13, wherein the third section of the second axle member has a first angle surface and a second angle surface, and the first shim and the third shim each have an angled surface shaped to engage the first and second angle surfaces of the third section of the second axle member.

15. The adjustable track-width system of claim 13, wherein the first axle member has a general square shape or a general rectangular shape, a first corner and a second opposing corner defines the first section of the first axle member, the first corner includes the first shim, the second corner includes the third shim.

16. The adjustable track-width system of claim 15, wherein the first shim and the third shim are formed integrally with the first axle member.

17. The adjustable track-width system of claim 15, wherein the first shim and the third shim are separate components coupled to the first axle member.

18. The adjustable track-width system of claim 13, wherein the first shim and the third shim each includes a body portion and a cushion member, the body portion engaging the first axle member and the cushion member engaging the second axle member.

19. An adjustable track-width system for an agricultural machine, the adjustable track-width system comprising:
a fixed axle member having a first section and a second section, the first section defined by a first corner and a second corner;
an adjustable axle member having a third section and a fourth section, the adjustable axle member receivable by the fixed axle member and movable between a first position and a second position within the fixed axle member;
a first fixed shim at the first corner defining the first section of the fixed axle member;
a second fixed shim at the second corner defining the first section of the fixed axle member; and
an adjustable shim, at least a portion of the adjustable shim between the second section of the fixed axle member and the fourth section of the adjustable axle member, the adjustable shim movable between a lock position where the adjustable axle member is held in position relative to the fixed axle member and an adaptable position where the adjustable axle member is movable between the first position and the second position.

20. The adjustable track-width system of claim 19, wherein the at least the portion of the adjustable shim is a first portion of the adjustable shim, the adjustable shim further including:
a second portion that is on an exterior surface of the agricultural machine.

* * * * *